UNITED STATES PATENT OFFICE.

JOHN D. LOGAN, OF PHILADELPHIA, PENNSYLVANIA.

ENAMELING BRICKS.

SPECIFICATION forming part of Letters Patent No. 239,393, dated March 29, 1881.

Application filed February 14, 1881. (No model.)

*To all whom it may concern:*

Be it known that I, JOHN D. LOGAN, a citizen of the United States, residing at Philadelphia, in the county of Philadelphia and State of Pennsylvania, have invented certain new and useful Improvements in Enameling Bricks; and I do hereby declare the following to be a full, clear, and exact description of the invention, such as will enable others skilled in the art to which it appertains to make and use the same.

My invention relates to an improved compound and process for enameling bricks; and the novelty consists in the solutions and process for applying the same hereinafter more fully set forth.

The object of the invention is to treat bricks or building-blocks to solutions or coloring-matter and glaze, whereby their value for building purposes will be enhanced, and a building be ornamented by allowing a choice of colors and shades at the will of the builder.

In carrying out the invention I employ the following formula to form the solution, which, for convenience, I will designate the "white body or slip:" blue clay, ninety-nine pounds; china-clay, three hundred and twenty-one pounds; spar, three hundred and fifteen pounds; flint, forty-two pounds; bone, (calcined and ground,) three hundred and fifty-four pounds. These ingredients are mixed in a sufficient quantity of water which will give a consistence to the solution that will allow it to be passed through a bolting-cloth of seventy meshes to square inch, after which the solution is allowed to settle, and the water poured off until the residuum will weigh, approximately, twenty-four ounces to the pint. The bricks are dipped or immersed in this solution and allowed to dry, after which they are treated with a glaze or enameling solution and again dried. The glaze-solution I prepare as follows: spar, ninety pounds; paris-white, eighty pounds; china-clay, twenty pounds; borax, sixty pounds; soda-ash, sixty pounds; flint, forty pounds. These I mix and calcine in a gloss-kiln. Of this mixture, take two hundred pounds; spar, seventy pounds; flint, forty pounds; white lead, fifty pounds. Grind together wet, and with water form a solution which will pass through a bolting-cloth of eighty meshes to the square inch. After treating with this solution the bricks are placed in seggars and set in a kiln and burned until the glaze flows.

The white body may be changed to a green slip by taking two quarts of the same and adding thereto two ounces of black oxide of copper and one ounce of blue calx; to a blue slip by taking four quarts of the same and adding four ounces of blue calx; to a drab slip by taking four quarts of the same and adding two ounces of black oxide of manganese and one ounce of blue calx. To make a black slip, I take one hundred pounds of brick-clay, and with water form a solution which will pass through a bolting-cloth of seventy meshes to the square inch, then add twenty-five pounds of carbonate of iron and thirteen pounds of black oxide of manganese, and reduce the whole to a liquid weighing twenty-four ounces to the pint.

The blue calx hereinbefore mentioned is formed as follows: Take oxide of cobalt, ten pounds; spar, thirty pounds; oxide of zinc, four pounds; nitrate of soda, two and one-half pounds. Mix and calcine in a gloss-kiln, and grind wet to a solution of thirty-two ounces to the pint.

Having thus described this invention, what I claim, and desire to secure by Letters Patent of the United States, is—

1. The method of enameling bricks herein described, consisting of immersing them in the solution of slip specified, drying them, afterward dipping them in the glazing-solution described, and finally placing them in seggars and burning them until the glaze runs, as set forth.

2. An enamel for bricks, consisting of blue clay, china-clay, spar, flint, calcined bone, paris-white, borax, and a suitable coloring-matter, as and for the purpose set forth.

In testimony whereof I affix my signature in presence of two witnesses.

JOHN D. LOGAN.

Witnesses:
THOS. D. MOWLDS,
CHAS. H. WHITE.